(12) United States Patent
Han et al.

(10) Patent No.: US 7,210,402 B2
(45) Date of Patent: *May 1, 2007

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 239 days.

This patent is subject to a terminal disclaimer.

(21) Appl. No.: 10/736,836

(22) Filed: Dec. 17, 2003

(65) Prior Publication Data

US 2004/0154477 A1 Aug. 12, 2004

(30) Foreign Application Priority Data

Feb. 6, 2003 (KR) .................. 10-2003-0007562

(51) Int. Cl.
*A47J 37/00* (2006.01)

(52) U.S. Cl. .................. 99/400; 99/401; 99/446; 99/447; 126/41 R (58) Field of Classification Search .................. 99/447, 99/446, 401, 400; 126/41 R; 219/405; 392/422
See application file for complete search history.

(56) References Cited

U.S. PATENT DOCUMENTS 3,152,242 A 10/1964 De Mott
3,154,004 A 10/1964 Huck
3,371,659 A 3/1968 Paspalas
3,555,995 A 1/1971 Berger
3,596,650 A 8/1971 Cerola
4,350,874 A * 9/1982 Nishikawa .................. 219/400
4,508,024 A 4/1985 Perkins
4,665,893 A 5/1987 Miyagawa et al.

(Continued)

FOREIGN PATENT DOCUMENTS

FR 2 670 274 6/1992

(Continued)

OTHER PUBLICATIONS

Korean Patent Abstract No. 2002-16089, published Mar. 4, 2002.

(Continued)

*Primary Examiner*—Reginald Alexander
(74) *Attorney, Agent, or Firm*—Staas & Halsey LLP (57) ABSTRACT

A cooking apparatus includes a body, a pair of heating units, a grill unit, a heat reflecting unit, and a cooling fan. The heating units are arranged between the grill unit and the heat reflecting unit. The heat reflecting unit includes inner and outer reflecting plates that are inclined at certain angles to reflect heat radiated from the heating units toward the grill unit. The cooling fan is positioned in an inner space of the heat reflecting unit. The heat reflecting unit has front, rear, and side plates, which are provided with a plurality of through holes, so that air passes through the inner space of the heat reflecting unit.

16 Claims, 8 Drawing Sheets

U.S. PATENT DOCUMENTS

| | | | |
|---|---|---|---|
| 4,865,864 A * | 9/1989 | Rijswijck | 426/520 |
| 4,893,609 A | 1/1990 | Giordani et al. | |
| 5,176,067 A * | 1/1993 | Higgins | 99/340 |
| 5,189,945 A | 3/1993 | Hennick | |
| 5,287,799 A * | 2/1994 | Pickering et al. | 99/446 |
| 5,372,121 A | 12/1994 | Castillo | |
| 5,535,733 A | 7/1996 | Hait | |
| 5,676,870 A * | 10/1997 | Wassman et al. | 219/400 |
| 5,801,362 A * | 9/1998 | Pearlman et al. | 219/400 |
| 6,125,838 A | 10/2000 | Hedgpeth | |
| 6,260,478 B1 * | 7/2001 | Harneit | 99/446 |
| 6,293,276 B1 | 9/2001 | Owens et al. | |
| 6,502,504 B1 * | 1/2003 | Gschwind | 99/446 |
| 6,935,329 B2 * | 8/2005 | Han et al. | 126/41 R |
| 2001/0039884 A1 * | 11/2001 | Backus et al | 99/421 H |

FOREIGN PATENT DOCUMENTS

| | | |
|---|---|---|
| FR | 2 724 833 | 3/1996 |
| GB | 2 286 111 | 8/1995 |

OTHER PUBLICATIONS

Japanese Patent Abstract No. 11-267032, published Oct. 5, 1999.
Patent Abstract of Japan Publication No. 2001-120440 dated May 8, 2001.
Patent Abstract of Japan Publication No. 2000-254007 dated Sep. 19, 2000.
Patent Abstract of Japan Publication No. 2000-166771 dated Jun. 20, 2000.
Patent Abstract of Japan Publication No. 03-026216 dated Feb. 4, 1991.
Patent Abstract of Korea Publication No. 2002-16089, dated Mar. 4, 2002.
U.S. Appl. No. 10/706,926, filed Nov. 14, 2003, Han et al., Samsung Electronics Co., Ltd.
U.S. Appl. No. 10/681,132, filed Oct. 9, 2003, Han et al., Samsung Electronics Co., Ltd.
U.S. Appl. No. 10/681,136, filed Oct. 9, 2003, Han et al., Samsung Electronics Co., Ltd.
U.S. Appl. No. 10/682,548, filed Oct. 10, 2003, Han et al., Samsung Electronics Co., Ltd.
U.S. Appl. No. 10/687,603, filed Oct. 20, 2003, Han et al., Samsung Electronics Co., Ltd.
U.S. Appl. No. 10/689,746, filed Oct. 22, 2003, Han et al., Samsung Electronics Co., Ltd.
U.S. Appl. No. 10/691,551, filed Oct. 24, 2003, Han et al., Samsung Electronics Co., Ltd.
U.S. Appl. No. 10/705,893, filed Nov. 13, 2003, Han et al., Samsung Electronics Co., Ltd.
U.S. Appl. No. 10/731,159, filed Nov. 17, 2003, Han et al., Samsung Electronics Co., Ltd.

* cited by examiner

COOKING APPARATUS

CROSS-REFERENCE TO RELATED APPLICATIONS

This application claims the benefit of Korean Application No. 2003-7562, filed Feb. 06, 2003, in the Korean Intellectual Property Office, the disclosure of which is incorporated herein by reference.

BACKGROUND OF THE INVENTION

1. Field of the Invention

The present invention relates generally to a cooking apparatus, and more particularly, to a cooking apparatus that is capable of effectively transferring heat to food to be cooked, thereby improving an energy efficiency of the cooking apparatus and reducing cooking time.

2. Description of the Related Art

Generally, meat, such as beef and pork, and processed meat, such as sausage and ham, are most delicious when grilled, in which food is cooked by directly applying heat to the food while putting the food on a grill. Accordingly, people are fond of having meat and processed meat grilled.

In general, a cooking apparatus that grills food includes a heating unit that applies heat to food, and a grill unit on which the food is put to be partially exposed to the heating unit. The cooking apparatus functions to cook the food by transferring heat generated by the heating unit to food put on the grill unit.

To grill meat such as beef, pork, and mutton, the meat is cut into slices having an appropriate size, and is put on the grill unit, and sauce made of various condiments is applied thereto. When slices of meat mixed with sauce are heated by heat transferred from the heating unit, oil contained in the slices of meat and sauce applied to the meat drop downward.

Consequently, an oil collecting unit is provided in a body of the cooking apparatus to collect heated oil and sauce that drop downward from the slices of meat. The oil collecting unit is disposed under the grill unit, and the heating unit is disposed between the grill unit and the oil collecting unit.

But the conventional cooking apparatus constructed as described above cooks food using only heat transferred upward from the heating unit, because the heating unit is disposed just under the grill unit. Accordingly, the conventional cooking apparatus cannot effectively transfer heat to the food, so the conventional cooking apparatus has a low energy efficiency, and requires a lengthy cooking time.

Additionally, the conventional cooking apparatus is disadvantageous in that the grill unit is maintained at high temperature by the heat received from the heating unit, so portions of food in contact with the heated grill unit burn, thus deteriorating the taste of the food and potentially doing harm to users' health.

SUMMARY OF THE INVENTION

Accordingly, it is an aspect of the present invention to provide a cooking apparatus, which is capable of allowing heat generated by a heating unit to be effectively transferred to food to be cooked.

It is another aspect of the present invention to provide a cooking apparatus, which is capable of cooling a heat reflecting unit using air.

Additional aspects and/or advantages of the invention will be set forth in part in the description which follows and, in part, will be obvious from the description, or may be learned by practice of the invention.

The foregoing and/or other aspects of the present invention are achieved by providing a cooking apparatus with a body provided in a top thereof with an opening, a pair of heating units arranged on sides of the body toward the opening, a grill unit mounted on the top of the body, a heat reflecting unit arranged below the grill unit to reflect heat transferred from the heating unit toward the grill unit, and a cooling fan to cool the heat reflecting unit.

According to one aspect, the heat reflecting unit has: front, rear, and side plates, and a pair of inner reflecting plates and a pair of outer reflecting plates arranged between the front, rear, and side plates, to reflect heat generated by the heating units toward the grill unit.

According to one aspect, the cooling fan is attached to lower surfaces of the inner reflecting plates, to forcibly cool the inner and outer reflecting plates.

According to one aspect, the front and side plates of the heat reflecting unit are provided therethrough with through holes to draw air into an interior of the heat reflecting unit, in which the cooling fan is arranged, and to discharge the air from the interior of the heat reflecting unit.

According to one aspect, the cooling fan is an axial-flow fan.

According to one aspect, the cooling fan is attached at ends thereof to the front and rear plates of the heat reflecting unit, respectively, to forcibly air-cool the inner and outer reflecting plates.

According to one aspect, the cooling fan is attached at ends thereof to the side plates of the heat reflecting unit, respectively, to forcibly air-cool the inner and outer reflecting plates.

According to one aspect, the cooking fan is a centrifugal fan.

According to one aspect, the cooking apparatus additionally has a temperature sensor mounted on a lower surface of one of the inner reflecting plates, to automatically operate the cooling fan when the inner reflecting plate exceeds a predetermined temperature.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 1:
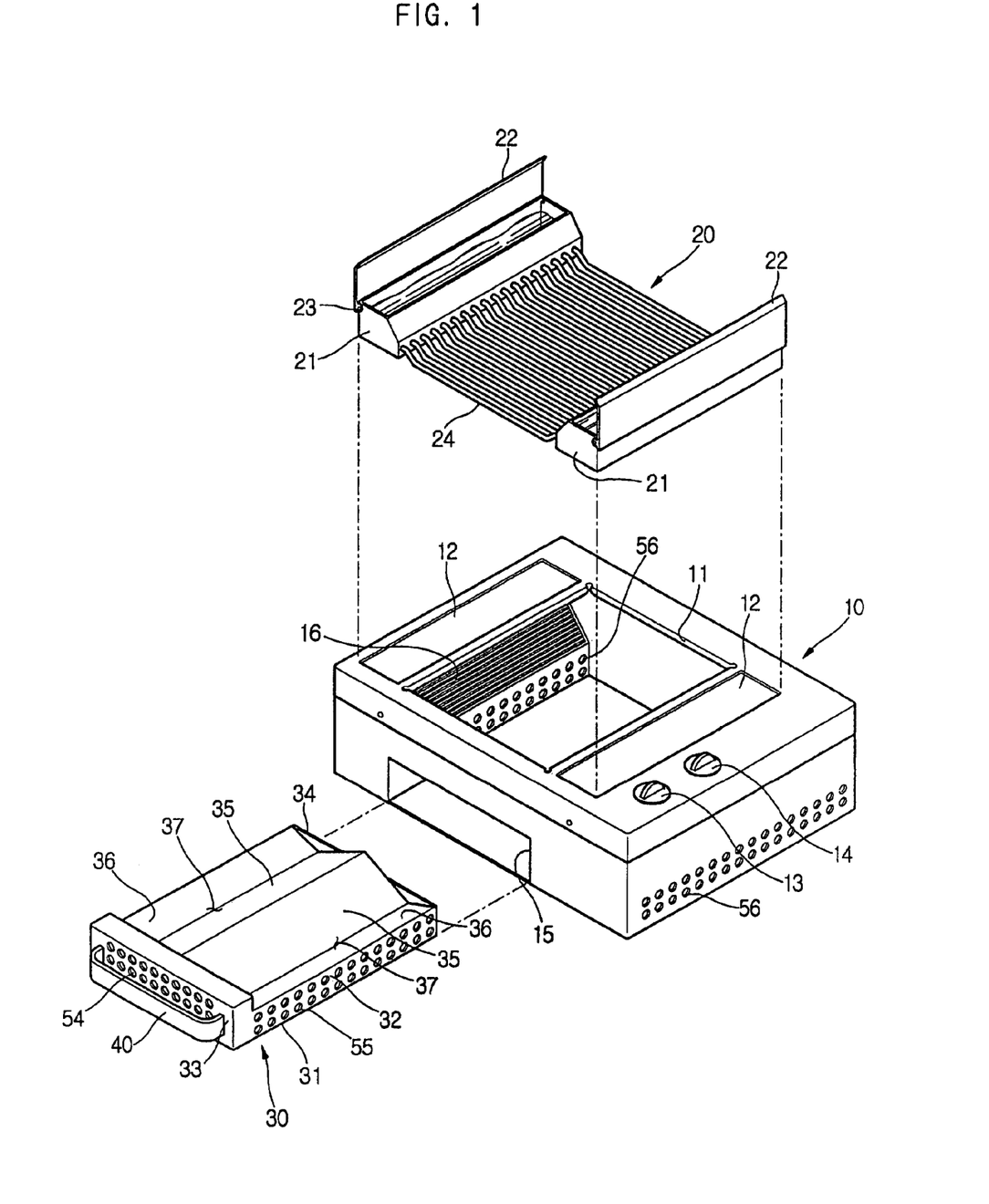
FIG. 1 is an exploded perspective view of a cooking apparatus, according to a first embodiment of the present invention.
Figure 2:
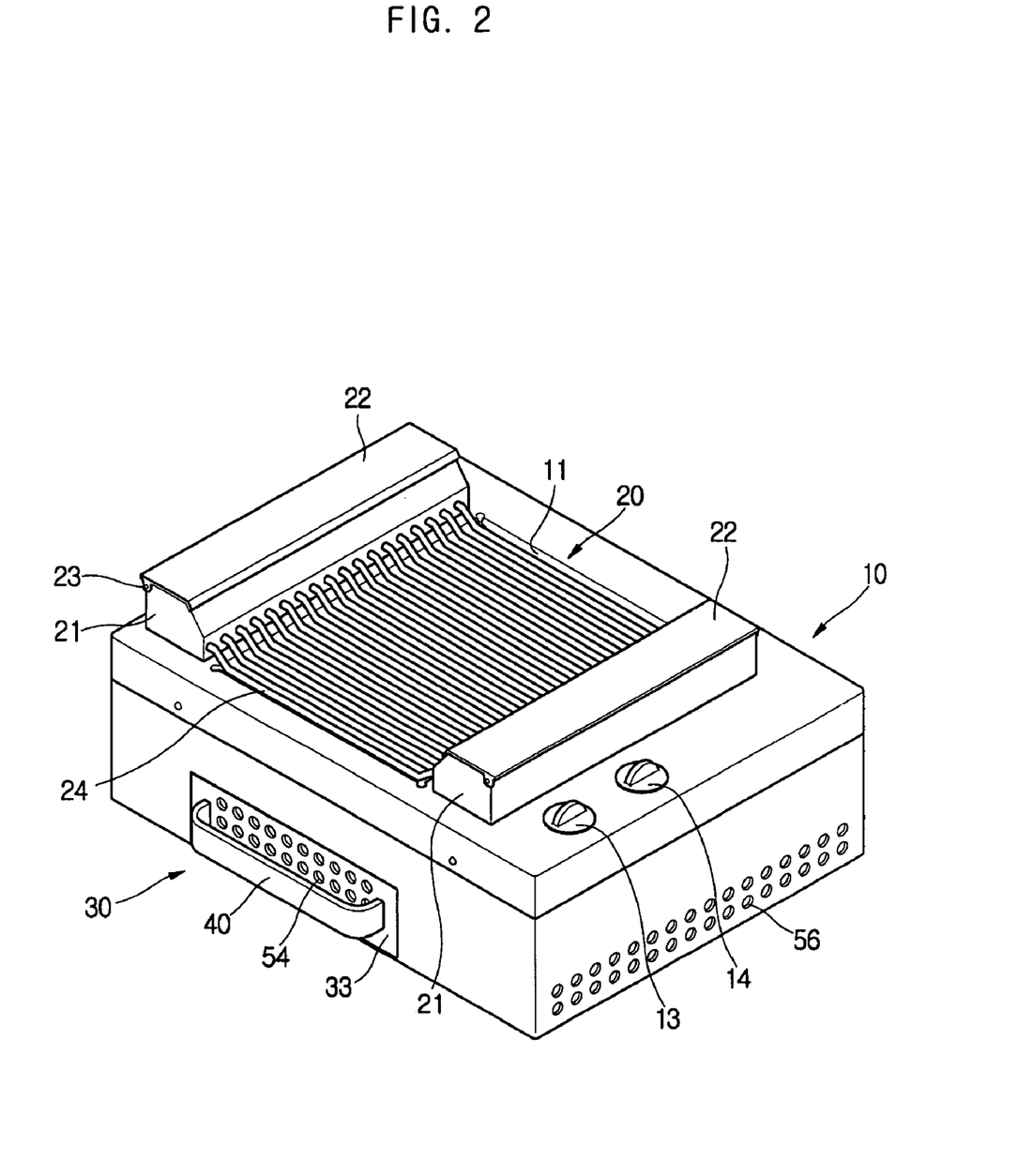
FIG. 2 is a perspective view of the cooking apparatus of FIG. 1.
Figure 3:
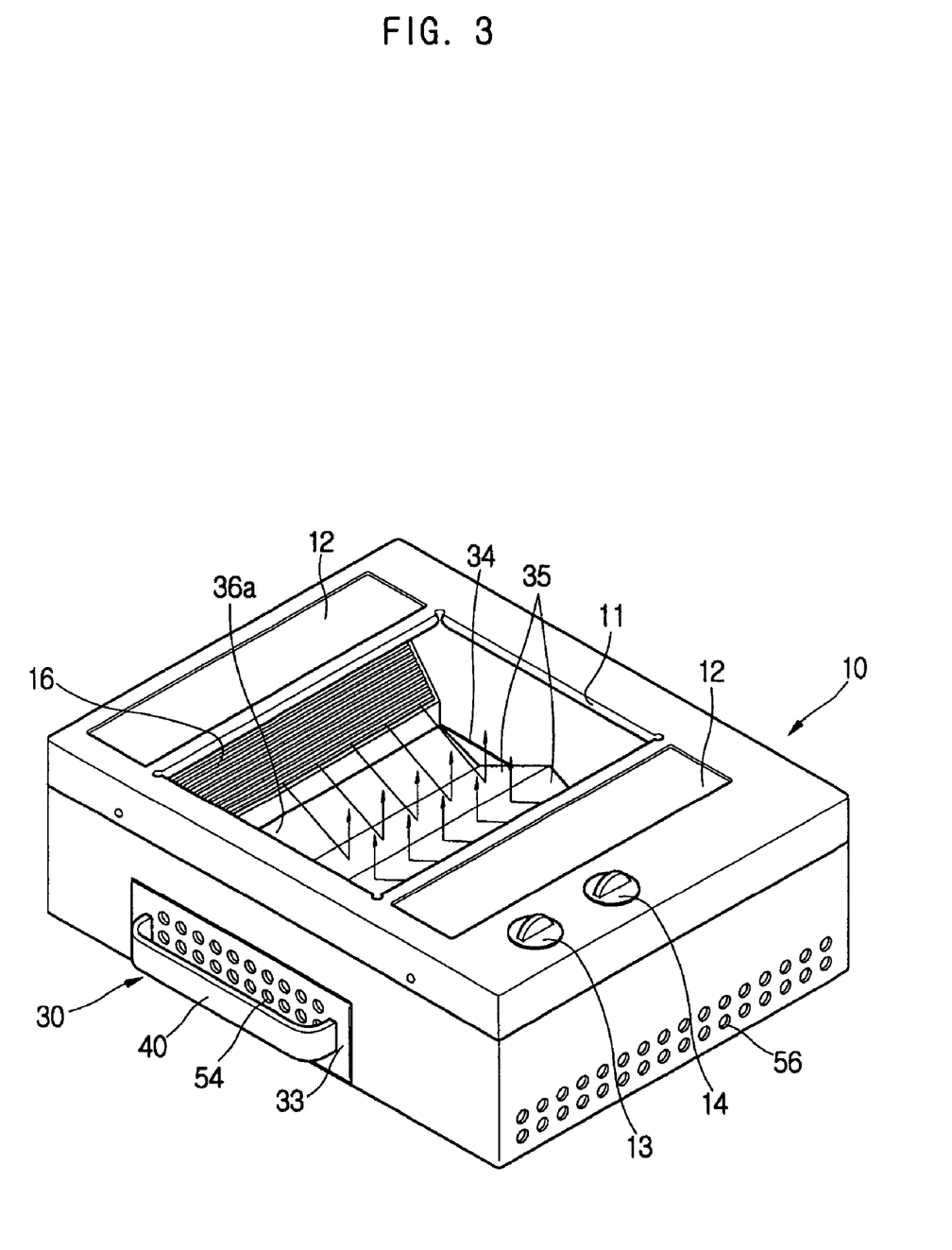
FIG. 3 is a perspective view of the cooking apparatus of FIG. 1 with a grill unit removed from a body illustrating operation of a heat reflecting member.
Figure 4:
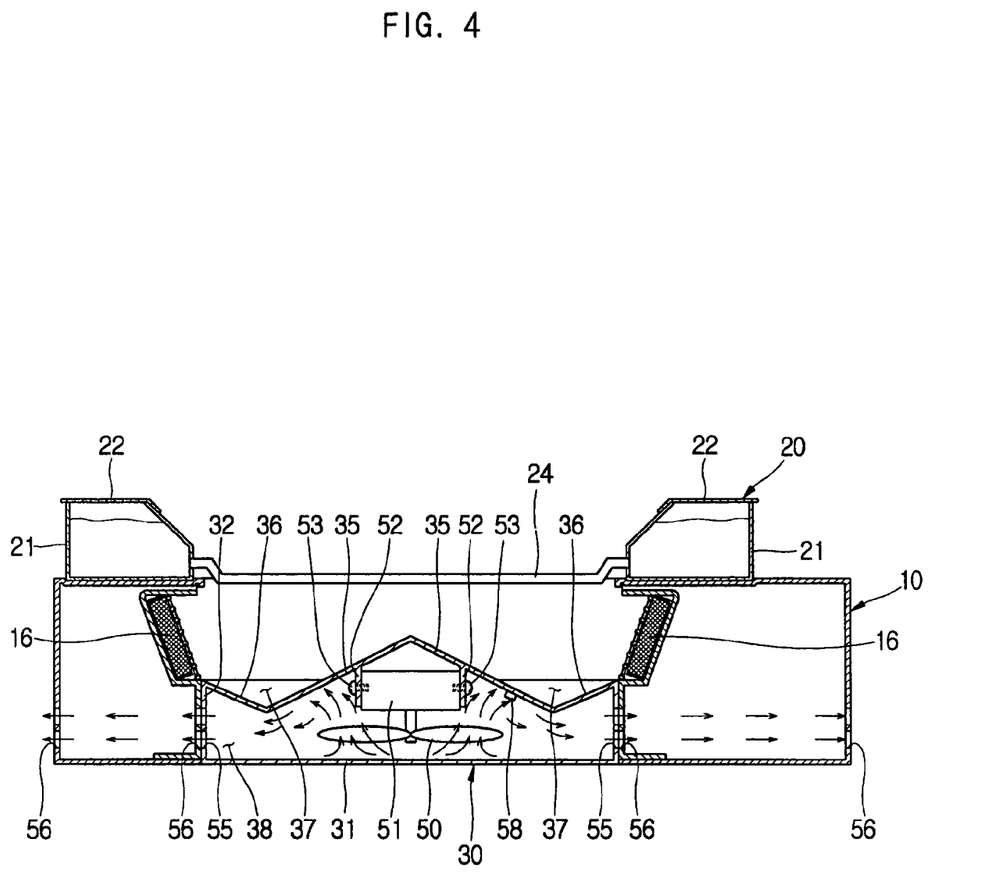
FIG. 4 is a vertical sectional view of the cooking apparatus of FIG. 1 illustrating operation of a cooling fan.

FIG. 1 is an exploded perspective view of a cooking apparatus, according to a first embodiment of the present invention. FIG. 2 is a perspective view of the cooking apparatus of FIG. 1. FIG. 3 is a perspective view of the cooking apparatus of FIG. 1 with a grill unit removed from a body illustrating operation of a heat reflecting member. FIG. 4 is a vertical sectional view of the cooking apparatus of FIG. 1 illustrating operation of a cooling fan.

FIGS. 1-4 illustrate the cooking apparatus, which has a body 10 constructed roughly in a box form, a plurality of heating units 16 disposed in the body 10 to apply heat to food, a grill unit 20 seated on a top of the body 10 to put food thereon, and a heat reflecting and oil collecting unit 30 positioned in a lower portion of the body 10 to transfer radiant heat to the grill unit 20, and simultaneously receive and collect oil generated from food put on the grill unit 20. That is, the heat reflecting and oil collecting unit 30 is constructed by integrating a heat reflecting structure with an oil collecting structure. Hereinafter, the heat reflecting and oil collecting unit 30 will be referred to as the "heat reflecting unit 30" for ease of description.

An opening 11 is provided in the top of the body 10 to allow heat generated from the heating units 16 to be transferred to the grill unit 20, and concave seat portions 12 are positioned on first and second sides of the opening 11 to stably seat the grill unit 20 thereon. A time switch 13 and a power switch 14 are positioned on a portion of the top of the body 10 to adjust the heating time and temperature of the heating units 16. Further, a slot 15 is positioned in the lower end portion of the body 10 to insert and remove the heat reflecting unit 30 therethrough.

The heating units 16 are a pair of heating units 16 arranged on the first and second sides of an interior of the body 10, and are inclined toward the opening 11. According to one aspect, the heating units 16 are gas heaters that generate heat by burning gas. According to another aspect, the heating units 16 are charcoal heaters that generate heat by burning charcoal. According to yet another aspect, the heating units 16 are ceramic heaters in which electrothermal wires generating heat using electricity are encapsulated therein, to emit high-temperature heat and far infrared rays therefrom.

The grill unit 20 has: a pair of water tanks 21 that are spaced apart from each other and seated on the seat portions 12, respectively; and a plurality of grill pipes 24 that are each connected at both ends thereof to the respective water tanks 21, and are filled with water.

A lid 22 is mounted on an open top of each of the water tanks 21 to selectively open and close the open top of the water tank 21 through the use of a hinge 23. Accordingly, the water tank 21 is filled with water while the lid 22 is opened, and the grill pipes 24 are filled with water, so that the portions of food in contact with the grill pipes 24 do not burn. Then, the lid 22 is closed.

The heat reflecting unit 30 has a bottom plate 31 with a rectangular shape, two side plates 32 upwardly extending from side edges of the bottom plate 31, and front and rear plates 33 and 34 upwardly extending from front and rear edges of the bottom plate 31, respectively, thus defining an appearance of the heat reflecting unit 30.

A pair of inner reflecting plates 35 and a pair of outer reflecting plates 36 are arranged above the bottom plate 31, and are connected to the side, front and rear plates 32, 33 and 34. The inner and outer reflecting plates 35 and 36 form a W shape, so a recess 37 is defined at junctions of the inner reflecting plates 35 to the outer reflecting plates 36, to collect oil and sauce dropping onto the reflecting plates 35 and 36.

The pair of inner reflecting plates 35 are inclined toward the heating units 16, respectively, with upper ends thereof connected to each other, and the pair of outer reflecting plates 36 are connected at lower ends thereof to lower ends of the inner reflecting plates 35, and connected at upper ends thereof to upper ends of the side plates 32. Accordingly, an inner space 38 is defined between the inner and outer reflecting plates 35 and 36 and the bottom plate 31.

The front plate 33 has a predetermined width. A grip 40 is positioned on a front of the front plate 33, to insert and remove the heat reflecting unit 30 from an interior of the body 10 when a user selectively pushes and pulls the heat reflecting unit 30 through the slot 15 of the body 10.

A cooling fan 50 and a fan motor 51 are disposed in the inner space 38 of the heat reflecting unit 30 to cool the inner and outer reflecting plates 35 and 36, and prevent oil and sauce dropping from food onto the inner and outer reflecting plates 35 and 36 from burning.

The fan motor 51 is supported by a pair of brackets 52 attached to lower surfaces of the inner reflecting plates 35 through screws 53. The cooling fan 50 is connected to the fan motor 51, and spaced apart from the bottom plate 31. It will be appreciated by one of ordinary skill in the art, that the heat reflecting unit 30 in which the cooling fan 50 is mounted can be removably fitted to the body 10 in such a manner that electric power can be supplied to the fan, if a plug (not shown) that is electrically connected to the fan is provided at the rear plate 34 of the heat reflecting unit, and a socket (not shown) into which the plug is inserted, is provided at a rear wall of the body 10.

According to one aspect, the cooling fan 50 is an axial-flow fan. A plurality of through holes 54, 55 and 56 are positioned through the side and front plates 32 and 33 and sides of the body 10, so that air is forcibly passed through the inner space 38 by operation of the cooling fan.

Further, a temperature sensor 58 is mounted on one of the inner reflection plates 35 to operate the cooling fan 50 when the temperature of the heat reflecting unit 30 surpasses a predetermined temperature. According to one aspect, the predetermined temperature is 200° C. Accordingly, when the temperature of the heat reflecting unit 30 increases to 200° C., the cooling fan 50 is operated, and air enters at the through holes 54, moves along the inner and outer reflecting plates 35 and 36, and is discharged via the through holes 55 and 56, thus cooling the heat reflecting unit 30.

In the cooking apparatus of the first embodiment constructed as described above, after the water tanks 21 and the grill pipes 24 are filled with water, food, such as beef, pork, or sausage, is put on the grill pipes 24 and the heating units 16 are operated by manipulation of the time switch 13 and the power switch 14. In this case, part of heat generated by the heating units 16 is transferred to the grill pipes 24, and part of the heat is reflected to the grill pipes 24 by the inner and outer reflecting plates 35 and 36 of the heat reflecting unit 30, so the food is rapidly cooked.

In that case, since the grill pipes 24 are filled with water, portions of food in contact with the grill pipes 24 are prevented from burning and adhering to the grill pipes 24 even though heat is transferred from the heating units 16 to the grill pipes 24.

In the meantime, when oil is separated from food and drops in the process of cooking the food, sauce formed of various condiments is also sometimes separated from the food along with oil. The oil and sauce, after dropping downward, flow along the inner and outer reflecting plates 35 and 36 and are collected within the recesses 37. In this case, the temperature sensor 30 senses when the temperature of the heat reflecting surpasses a predetermined temperature, and the cooling fan 50 is operated. Accordingly, surrounding air flows into the inner space 38 of the heat reflecting unit 30, cools the inner and outer reflecting plates 35 and 36, and is discharged via the through holes 55 and 56 from the cooking apparatus. As a result, oil and sauce adhering to the inner and outer reflecting plates 35 and 36, as well as oil and sauce collected within the recesses 37, are prevented from burning, so the work of cleaning the heat reflecting unit 30 after cooking is easily performed.

Figure 5:
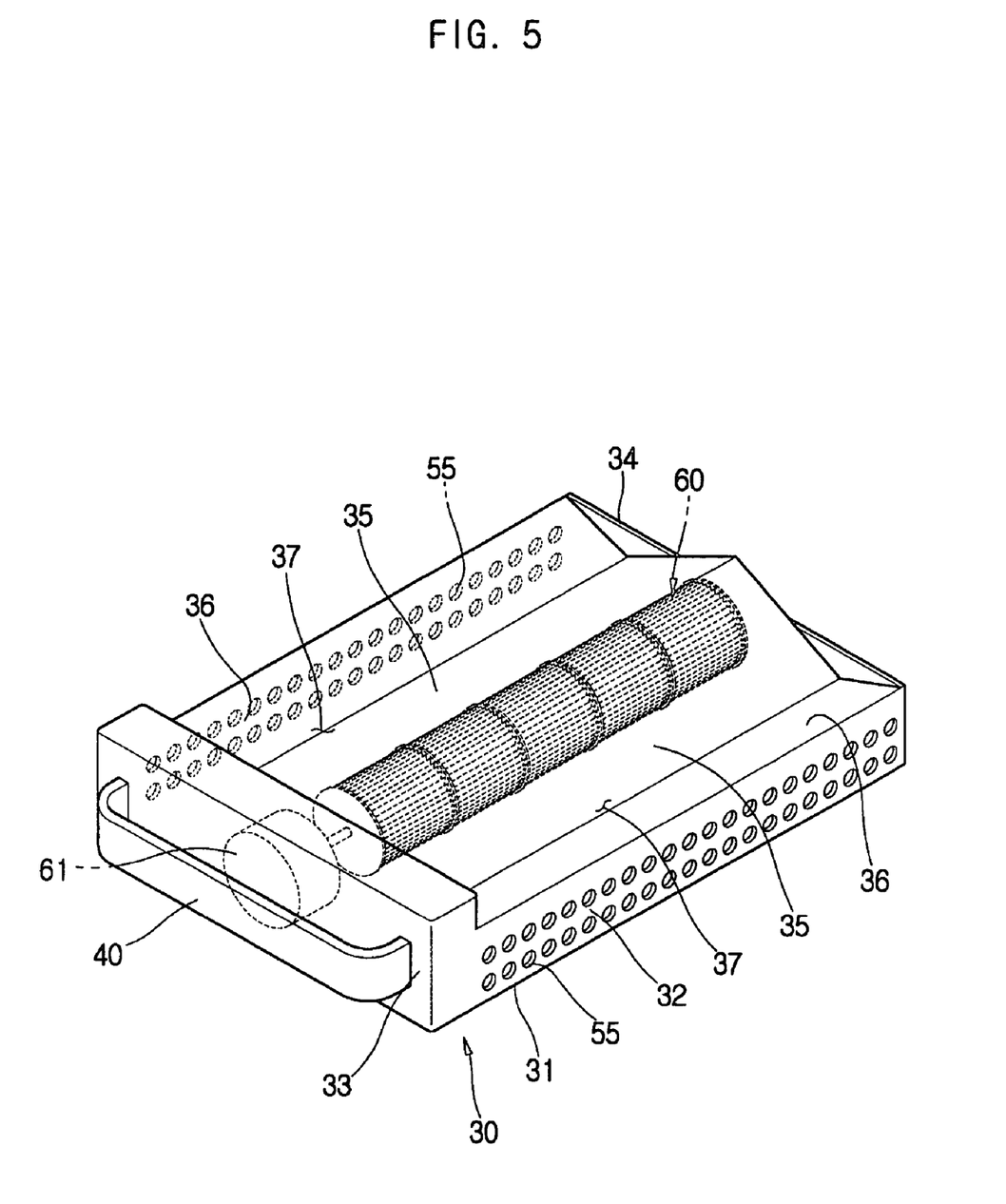
FIG. 5 is a perspective view of a heat reflecting unit equipped with a cooling fan according to a second embodiment of the present invention.
Figure 6:
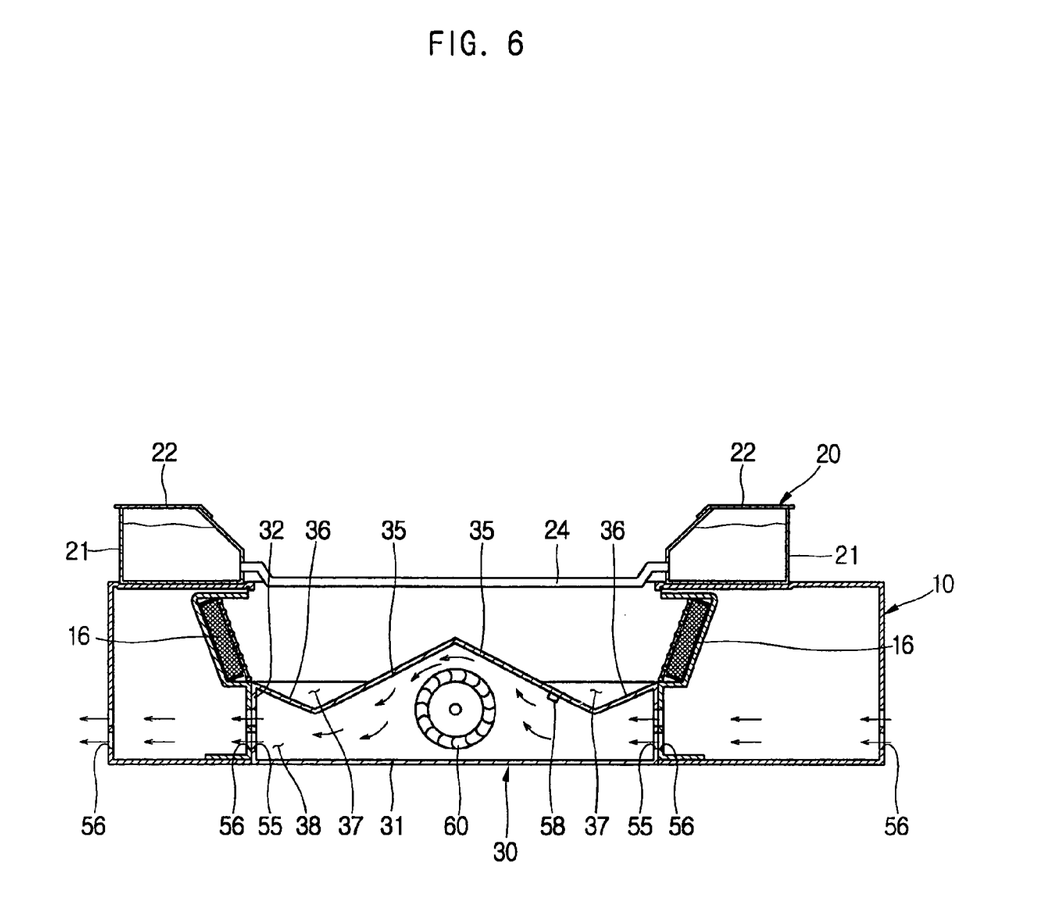
FIG. 6 is a vertical sectional view of a cooking apparatus illustrating an operation of the cooling fan of FIG. 5.

FIG. 5 is a perspective view of a heat reflecting unit equipped with a cooling fan according to a second embodiment of the present invention. FIG. 6 is a vertical sectional view of a cooking apparatus showing an operation of the cooling fan of FIG. 5.

As illustrated in these drawings, according to one aspect, the cooling fan 60 is a centrifugal fan, such as a sirocco fan, and is arranged along a length of the inner space 38 of the heat reflecting unit 30. The cooling fan 60 is fastened at a rear end thereof to the rear plate 34, and connected at a front end thereof to a fan motor 61, that is attached to the front plate 33, to rotate the cooling fan 60. Further, a plurality of through holes 55 and 56 are positioned through the side plates 31, the sides of the body 10, to allow air to pass through the inner space 38 of the heat reflecting unit 30.

Accordingly, as shown in FIG. 6, when the cooling fan 60 is operated, air enters at the right of the illustration through the through holes 55 and 56, cools the inner and outer reflecting plates 35 and 36, and is discharged via the through holes 55 and 56 at the left side of the illustration, thus preventing the inner and outer reflecting plates 35 and 36 from surpassing the predetermined temperature.

Since a cooking operation of the cooking apparatus equipped with the cooling fan 60 is the same as that of the cooking apparatus equipped with the cooling fan 50, a detailed description of the cooking operation is omitted.

Figure 7:
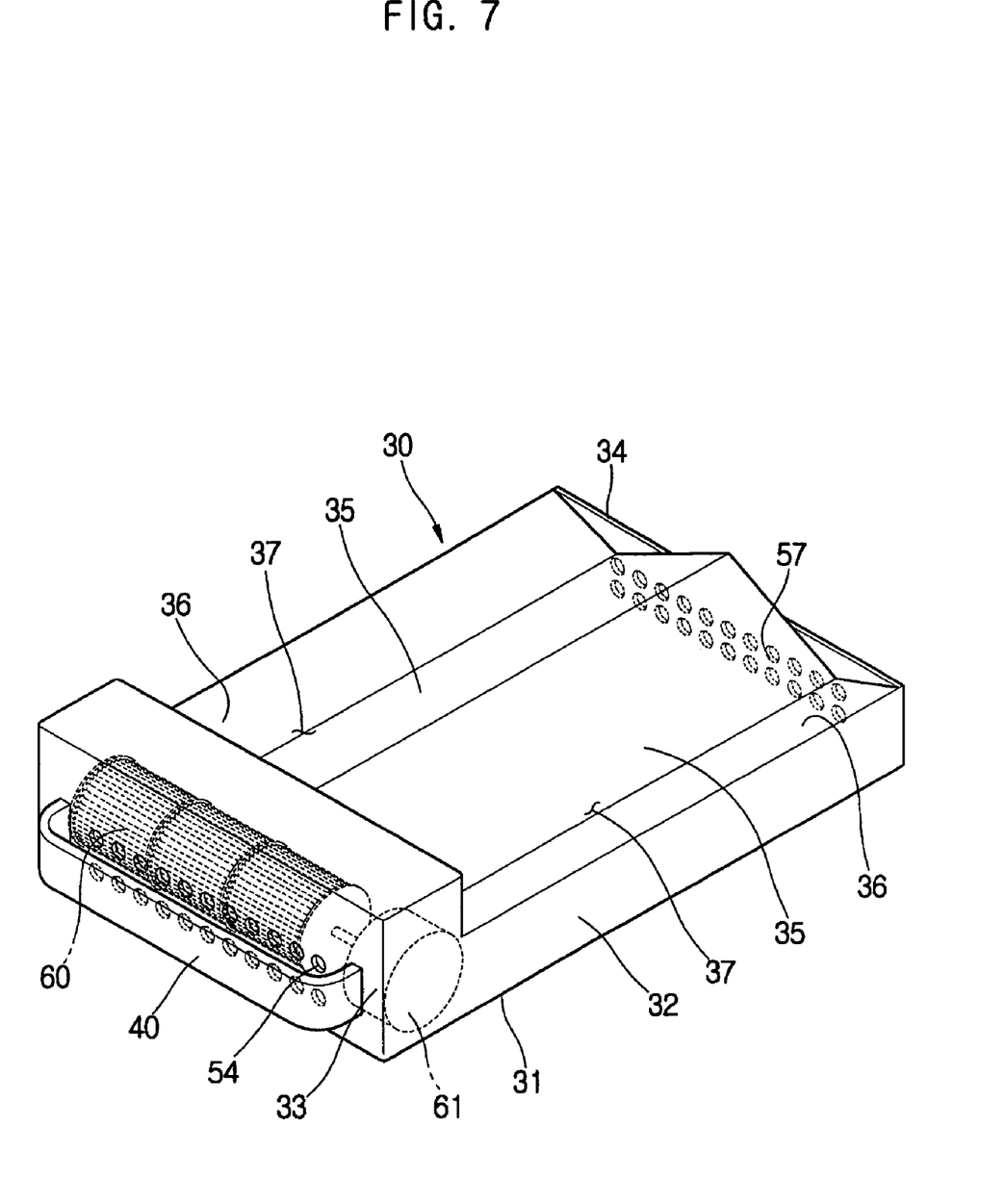
FIG. 7 is a perspective view of a heat reflecting unit equipped with a cooling fan according to a third embodiment of the present invention.
Figure 8:
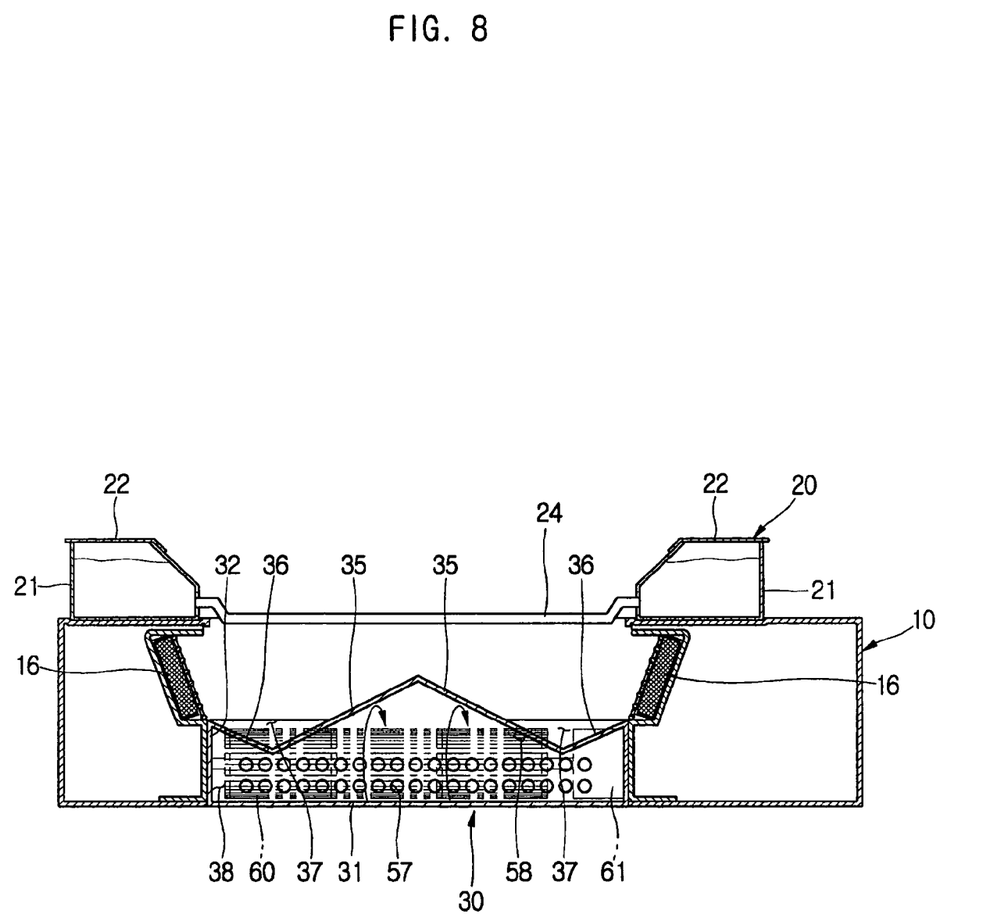
FIG. 8 is a vertical sectional view of a cooking apparatus illustrating operation of the cooling fan of FIG. 7.

FIG. 7 is a perspective view of a heat reflecting unit equipped with a cooling fan according to a third embodiment of the present invention. FIG. 8 is a vertical sectional view of the cooking apparatus showing operation of the cooling fan of FIG. 7.

As is illustrated in these drawings, the cooking apparatus equipped with the cooling fan 60 of the third embodiment is constructed to be the same as that of second embodiment, except for the arrangement of the cooling fan and through holes.

The cooling fan 60 of the third embodiment is a centrifugal fan, such as sirocco fan, and is arranged in a front portion of the inner space 38 of the heat reflecting unit 30. The cooling fan 60 is fastened at a first end thereof to a first side of the front plate 33, and connected at a second end thereof to a fan motor 61, that is attached to a second side of the front plate 33, to rotate the cooling fan 60. Further, a plurality of through holes 54 and 57 are positioned through the front plate 33 and rear plate 34, respectively, to allow air to pass through the inner space 38. Additionally, through holes (not shown) are positioned through a rear of the body 10 to communicate with the through holes 57, so that air passing through the through holes 57 is discharged from the cooking apparatus.

Accordingly, when the cooling fan 60 is operated, air enters the inner space 38 via the through holes 54 positioned in the front plate 33, cools the inner and outer reflecting plates 35 and 36, and is discharged via the through holes 57 positioned in the rear plate 34 of the heat reflecting unit 30, thus preventing the inner and outer reflecting plates 35 and 36 from exceeding the predetermined temperature.

Since the cooking operation of the cooking apparatus equipped with the cooling fan 60 of the third embodiment is the same as that of the cooking apparatus equipped with the cooling fan 50 of the first embodiment, a detailed description of the cooking operation is omitted.

As described above in detail, the cooking apparatus of the present invention directly transfers heat generated by the heating units to the grill unit, on which food is placed, and reflects heat to the grill unit through the use of the heat reflecting unit, so the energy efficiency of the cooking apparatus is increased, and the cooking time is decreased.

In addition, the cooking apparatus of the present invention has a structure, in which the inner and outer reflecting plates of the heat reflecting unit are cooled by the cooling fan, so oil and sauce dropping from the food onto the inner and outer reflecting plates are prevented from burning, and consequently the heat reflecting unit is easily cleaned after cooking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
   a body provided in a top thereof with a first opening;
   a pair of heating units arranged on sides of the body toward the first opening;
   a grill unit mounted on the top of the body;
   a heat reflecting unit, removably mounted in the body via a second opening therein, and arranged below the grill unit to reflect heat transferred from the heating unit toward the grill unit; and
   a cooling fan to cool the heat reflecting unit.

2. A cooking apparatus, comprising:
   a body provided in a top thereof with an opening;
   a pair of heating units arranged on sides of the body toward the opening;
   a grill unit mounted on the top of the body;
   a heat reflecting unit arranged below the grill unit to reflect heat transferred from the heating unit toward the grill unit; and
   a cooling fan to cool the heat reflecting unit,
   wherein the heat reflecting unit comprises:
      front, rear, and side plates, and a pair of inner reflecting plates and a pair of outer reflecting plates arranged between the front, rear, and side plates, to reflect heat generated by the heating units toward the grill unit.

3. The cooking apparatus as set forth in claim 2, wherein:
   the cooling fan is attached to lower surfaces of the inner reflecting plates, to forcibly cool the inner and outer reflecting plates.

4. The cooking apparatus as set forth in claim 3, wherein:
   the front and side plates of the heat reflecting unit are provided therethrough with through holes to draw air into an interior of the heat reflecting unit, in which the cooling fan is arranged, and to discharge the air from the interior of the heat reflecting unit.

5. The cooking apparatus as set forth in claim 3, wherein: the cooking fan is an axial-flow fan.

6. The cooking apparatus as set forth in claim 2, wherein: the cooling fan is attached at ends thereof to the front and rear plates of the heat reflecting unit, respectively, to forcibly air-cool the inner and outer reflecting plates.

7. The cooking apparatus as set forth in claim 6, wherein: the side plates of the heat reflecting unit are provided therethrough with through holes, to draw air into an interior of the heat reflecting unit, in which the cooling fan is arranged, and to discharge air from the interior of the heat reflecting unit.

8. The cooking apparatus as set forth in claim 6, wherein: the cooking fan is a centrifugal fan.

9. The cooking apparatus as set forth in claim 2, wherein: the cooling fan is attached at ends thereof to the side plates of the heat reflecting unit, respectively, to forcibly air-cool the inner and outer reflecting plates.

10. The cooking apparatus as set forth in claim 9, wherein: the front and rear plates of the heat reflecting unit are provided therethrough with through holes to draw air into an interior of the heat reflecting unit, in which the cooling fan is arranged, and to discharge air from the interior of the heat reflecting unit.

11. The cooling apparatus as set forth in claim 9, wherein: the cooking fan is a centrifugal fan.

12. The cooking apparatus as set forth in claim 2, further comprising:
a temperature sensor mounted on a lower surface of one of the inner reflecting plates, to automatically operate the cooling fan when the inner reflecting plate exceeds a predetermined temperature.

13. A removable heat reflecting unit for a cooking apparatus including a body and a heating unit, the heat reflecting unit comprising:
a frame;
reflecting plates mounted on the frame, to reflect heat from the heating unit; and
a cooling fan to cool the reflecting plates,
wherein the frame and the reflecting plates define an inner space therebetween,
the cooling fan is mounted in the inner space to cool the reflecting plates, and
the reflecting plates comprise
inner reflecting plates, non-coplanarly joined at first edges thereof, and
outer reflecting plates, each non-coplanarly joined to a second edge of one of the inner reflecting plates.

14. The heat reflecting unit according to claim 13, wherein the reflecting plates comprise:
at least one recess defined where at least one of the inner reflecting plates joins the corresponding outer reflecting plate, to collect liquid separated from the food during cooking.

15. The heat reflecting unit according to claim 13, wherein:
the cooling fan maintains the heat reflecting unit below a predetermined temperature, so that collected liquid and particulate do not burn.

16. A removable heat reflecting unit for a cooking apparatus including a body, a cooking surface, and a heating unit, the heat reflecting unit comprising:
a frame;
reflecting plates mounted on the frame, to reflect heat from the heating unit towards the cooking surface and collect liquid and particulate separated from food during cooking; and
a cooling fan to cool the reflecting plates,
wherein the frame and the reflecting plates define an inner space therebetween, the cooling fan is mounted in the inner space, and the cooling fan maintains the reflecting plates below a predetermined temperature, so that the collected liquid and particulate do not burn, and
the removable heat reflecting unit is sized to enter and exit an opening in the body.

* * * * *

UNITED STATES PATENT AND TRADEMARK OFFICE
CERTIFICATE OF CORRECTION

| | | |
|---|---|---|
| PATENT NO. | : 7,210,402 B2 | Page 1 of 1 |
| APPLICATION NO. | : 10/736836 | |
| DATED | : May 1, 2007 | |
| INVENTOR(S) | : Dae-Sung Han et al. | |

It is certified that error appears in the above-identified patent and that said Letters Patent is hereby corrected as shown below:

Column 7, Line 3, change "cooling" to --cooking--.

Column 7, Line 4, change "cooking" to --cooling--.

Column 7, Line 15, change "cooling" to --cooking--.

Column 7, Line 16, change "cooking" to --cooling--.

Column 7, Line 27, change "cooling" to --cooking--.

Column 7, Line 28, change "cooking" to --cooling--.

Column 7, Line 29, change "cooling" to --cooking--.

Signed and Sealed this

Seventh Day of August, 2007

JON W. DUDAS
*Director of the United States Patent and Trademark Office*